Figure 1:
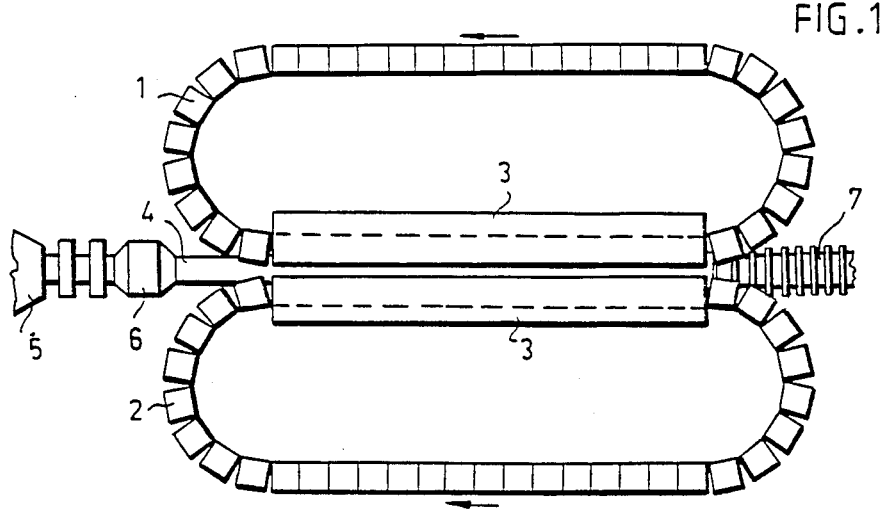

United States Patent [19]

Järvenkylä

[11] Patent Number: 4,721,594
[45] Date of Patent: Jan. 26, 1988

[54] METHOD AND AN APPARATUS FOR THE PRODUCTION OF RIBBED PIPES

[75] Inventor: Jyri Järvenkylä, Salpakangas, Finland

[73] Assignee: Uponor N.V., Sint Marteen, Netherlands

[21] Appl. No.: 910,617

[22] Filed: Sep. 23, 1986

[30] Foreign Application Priority Data

Mar. 20, 1986 [FI] Finland .................................. 861172

[51] Int. Cl.$^4$ ............................................. B29C 47/20
[52] U.S. Cl. ..................................... 264/508; 264/515; 264/173; 425/133.1; 425/326.1; 425/380; 425/393; 425/396
[58] Field of Search ..................... 264/508, 173, 209.3, 264/209.3–209.8, 514, 515, 506–507; 425/380, 326.1, 396, 133.1, 393

[56] References Cited

U.S. PATENT DOCUMENTS

| | | | |
|---|---|---|---|
| 3,298,064 | 1/1967 | Taga | 264/209.8 |
| 3,751,209 | 8/1973 | Schreiber | 425/376 R |
| 3,891,007 | 6/1975 | Kleykamp | 425/396 |
| 3,919,367 | 11/1975 | Maroschak | 264/508 |
| 4,036,930 | 7/1977 | Murai et al. | 264/40.7 |
| 4,255,107 | 3/1981 | Martin | 264/508 |
| 4,305,703 | 12/1981 | Lupke et al. | 264/173 |
| 4,365,948 | 12/1982 | Chaplain | 425/380 |
| 4,534,923 | 8/1985 | Lupke | 264/508 |

Primary Examiner—Jeffery Thurlow
Attorney, Agent, or Firm—Ladas & Parry

[57] ABSTRACT

This invention relates to a method and an apparatus for the production of ribbed pipes. The apparatus comprises a core which together with an extrusion sleeve forms a nozzle through which a plastic material is fed into a moulding space defined between a conically-enlarging mandrel and chill moulds moveable with respect to the mandrel. The volume of a moulding space defined between a plane at an end face of the extrusion sleeve, a surface of the mandrel, and a cylindrical plane projection from the surface of a kernel on the mandrel equals the combined volume of the grooves positioned at the mandrel at the mandrel at each particular moment. The method feeds a volume of the plastic material per unit time equal to volume of the pipe wall and ribs produced in that unit time.

19 Claims, 6 Drawing Figures

METHOD AND AN APPARATUS FOR THE PRODUCTION OF RIBBED PIPES

This invention relates to a method and apparatus for the production of an outwardly ribbed, plastic pipe having a smooth inner face.

British Patent Specification No. 1,431,796 discloses an apparatus for continuously producing a hose having relatively high, narrow, annular ribs about the periphery of an outer face of the hose, the inner face of the hose being smooth. The apparatus comprises chill moulds which go round along two endless paths, form a closed cavity adjacent a first extrusion head, and are provided with mutually spaced grooves on an inner face. An annular extrusion sleeve having an outer diameter substantially corresponding to the inner diameter of the chill moulds is positioned within the cavity and a straight mandrel of a constant diameter which is positioned on the central axis of the apparatus partially within the extrusion sleeve and partially extending beyond the extrusion sleeve. An annular nozzle is provided between the end of the extrusion sleeve and the mandrel, which nozzle is obliquely directed towards the grooved inner surface of the chill moulds and which opens into a small annular moulding space defined by the conical surface of the mandrel, the end face of the extrusion sleeve and the inner surface of the chill moulds. Hoses provided with reinforcing ribs can be manufactured by means of this apparatus by feeding an elastic material at a high pressure through the nozzle into a first moulding space in which the outer face of the hose is moulded by the inner surface of the chill moulds and the inner face thereof by the mandrel. The smooth inner layer is fed into a second moulding space.

This method of production, although fundamentally good, has certain disadvantages on account whereof it has not been applied for the manufacture of plastic pipes. The biggest disadvantages result from the missing special procedures required by a stiff plastic material for improving its flow properties as well as from the fact that operational disturbances occur in the process which are difficult to eliminate. These disturbances are due to the rapid abrupt variation in the volume of the first moulding space filled with a high-pressure non-compressible plastic material when the chill moulds move forwards with respect to the extrusion sleeve and the mandrel; this variation, in turn, is due to the grooves and ribs provided alternately on the inner surface of the chill moulds. Such sudden volume changes bring about pressure impacts which, for instance, cause the plastic material to be squeezed between the chill moulds, which can be seen as disadvantageous burrs in a finished product.

For the elimination of these problems, it has been suggested in U.S. Pat. Specification No. 4,365,948 that the speed of travel of the chill moulds be adjusted continuously in such a manner that when the volume of the moulding space is small, the speed is higher than when the volume of the moulding space is large. By virtue of this idea per se known from the general plastic pipe manufacturing technique, the flow of the plastic material remains constant, and no pressure impacts occur. A disadvantage of this solution, however, is the complicated speed adjusting device required. Furthermore, it is difficult to rapidly adjust the speed of the sequence of chill moulds because of the inertial forces, whereby the rate of production of the apparatus is rather low.

The two methods mentioned above are so called extrusion moulding methods which are characterized in that the diameter of the mandrel or, more precisely, the kernel, does not increase, but rather decreases from the nozzle onwards. Consequently, the pressure which forces the material into the grooves of the chill moulds is wholly derived from the extruder. The pressure is created by the cooling material, which forms a plug.

An essential problem with these methods is the control of the extrusion pressure with high-viscosity plastics and the evenness of the feed. Overfeeding constitutes a constant risk factor which is difficult to eliminate because the quality of the product suffers when the temperature drops, i.e. the inner face gets coarse and/or the grooves are not filled completely. For these reasons, it has not been possible to apply the methods to the production of large plastic pipes or to plastics having a high module of elasticity, such as a PVC-material without any softener.

The basic idea disclosed in German Patent Specification No. 2,362,444 deviates from that of prior methods. A characteristic feature is that the moulding space is very small and closed. The mandrel and the extrusion sleeve are conical. That part of the mandrel which extends beyond the sleeve forms a linear extension of the part within. The kernel is straight. Since the moulding space is closed in the backward direction, too, this method can be considered similar to a continuous injection moulding. Therefore the difficulties occuring in the process are of such proportions that the method has never been applied in practice. The pressure adjustment is extremely difficult and, further, the theoretical capacity is low on account of the high shearing velocities, because the stroke volume is too small.

French Patent Specification No. 7,315,485 discloses a manufacturing method, which is based on injection moulding, the basic idea of which resembles that of the method discussed above. In this French Patent Specification, a short piece of pipe, 10 to 40 cm, is extruded between two mould halves and displaced forwards, and this step is repeated so that a subsequent piece to be extruded will be welded to a previous one. The method is advantageous in that it is possible to apply extremely high injection pressures which provide a smooth inner face. Disadvantages are e.g. the high price of the apparatus due to the above-mentioned pressures and problems occuring in the synchronizing because of the cyclic nature of the method.

A third variation of the injection moulding principle is disclosed in German Patent Specification No. 1,233,128. This is likewise characterized by a linear extension of the mandrel after the nozzle, a straight kernel and a space closed in the forward and backward direction. The difficulties are the same as above and, consequently, this method is not applied for the production of plastic pipes.

The third basic principle for the production of ribbed pipes having a smooth inner face is known both from Finnish Patent Specification No. 60,825 and German Patent Publication No. 2,709,395. A conically enlarging part of the mandrel is, in these apparatuses, positioned at a rather great distance from the extrusion sleeve, and the moulding space defined between the extrusion sleeve, the mandrel and the moulding means, i.e. chill moulds, is open backwards through a gap between the extrusion sleeve and the chill moulds. In these methods, the plastic material flows smoothly from the axial nozzle obliquely outwards towards the inner surface of the chill moulds and is forced into the grooves of the chill moulds due to the increasing diameter of the mandrel and the traction force of the chill moulds. Therefore, this method can be regarded as an extrusion moulding method.

Even though the basic idea is correct, these latter methods do not work as desired in practice. The result is a pipe in which the ribs are not properly filled and the inner face of which is extremely coarse. In addition, the process is hampered by the adjusting disturbances mentioned above. Accordingly, the processes are not in use.

It has not been realized what is decisively important in an extrusion moulding process. As a result of the excessive volume of the moulding space in relation to the volume of the pipe, the material is cooled excessively by the chill moulds and gets stiff. If the temperature of the material is increased, it will burn. So the length of the mandrel, which is defined in Finnish Patent Specification No. 60,825 as about 4 to 5 times the diameter, is too great, leading to a disproportion between the volume of the pipe and that of the moulding space.

As stated above, variations in the volume of the moulding space cause pressure impacts which, in turn, cause burrs between the chill moulds. Such burrs are disadvantageous in view of the operating qualities of the pipe. E.g. a longitudinal burr on the outer face of the pipe between two ribs makes it impossible to use this face as a sealing face. This, however, would provide a natural sealing face for a rubber ring, because it is well supported on the ribs.

In addition to this kind of volume variation, another disturbance causing burrs occurs in the methods according to the above-mentioned patent specifications. This disturbance is due to a natural swaying, i.e. variation, of the speed of the corrugator, i.e. chill mould chain, and variation in the flow of material fed by the extruder. In conventional methods, the influence of these kinds of disturbances can be prevented only by giving the closing force of the chill moulds a high value. A great closing force is necessary because the moulding spaces are presently so dimensioned that high pressures are necessary. This, in turn, leads to extremely expensive solutions. The core of the problem is thus how to dimension the moulding space in such a manner that the ribs are filled easily and completely without having to increase the pressure to the extent customary in injection moulding.

Difficulties of process technology occuring in connection with known methods have been discussed above. These alone are perhaps not enough to explain the fact that not a single one of these methods has been applied industrially for the production of plastic pipes. The most important reason why these methods are unsuitable for the production of high-quality plastic pipe might be that the moulding conditions are not physically appropriate.

The industrial production of thermoplastic bodies is based on the mouldability of thermoplastics by means of pressure and heat. Simultaneous pressure and heat is essential when two material flows are to be joined in a machine. A complete welding is effected only if these two elements are allowed to influence the plastic for a sufficient time. It has been found out that this time factor is due to the slowness of the movement of the molecule chains, i.e. relaxation. The required welding time can thus be shortened by increasing the welding temperature or the strain prevailing in the material. Defective welding appears e.g. as delamination at an elevated temperature, cold seams, and deteriorated mechanical qualities.

In the methods discussed above, these problems become apparent because of the conflicting aims; in an attempt to rise the production capacity, high injection speeds are used, whereby the shearing speeds are high and the risk of melting cracks increases. The molecule chains do not have enough time to recombine because the temperature drops simultaneously on account of the cooling effect of the chill mould chain and/or the mandrel.

The object of the present invention is to provide an apparatus for the production of ribbed pipes, which apparatus enables a smooth laminar flow of the plastic from the nozzle through the moulding space to the area of the kernel, requires only reasonable pressures and nevertheless produces pipes with complete ribs. The apparatus according to the invention is characterized in that the volume of an annular space defined by a plane extending transversely to the center line of a core adjacent to an end face of an extrusion sleeve, a surface of said mandrel, and a cylindrical plane projection from the outer surface of said kernel corresponds substantially to the combined filling volume of rib-forming grooves of a moulding means which are positioned at said mandrel at each particular moment.

It has been unexpectedly found out according to the invention that the disadvantages mentioned above can be avoided by such a construction of the apparatus that the above-mentioned volumes are substantially identical, the greatest allowed deviation being about 25 percent. The reason therefor is not known for sure, but it can be assumed that an advantageous relation is thereby obtained between the volume of the pipe and the volume of the moulding space, by virtue of which relation any unnecessary turbulence of the plastic material as well as the formation of cold seams can be avoided. Anyway, tests have been carried out which show that the plastic material flowing within the extrusion sleeve closest to the spindle passes along the surface of the mandrel substantially without any turbulence to the area of the kernel where it forms a flawless pipe wall. A layer of plastic material flowing within the extrusion sleeve closest thereto is, in turn, wholly passed into the grooves of the chill moulds. In this way, a very smooth flow is obtained in which there occurs no whirls and which, consequently, produces pipes of high quality. In the apparatus according to the invention, no pressure impacts occur, either. This is due to the fact that the length of the stroke volume is so dimensioned that, as one groove of a moving chill mould is being closed, another groove simultaneously opens, by the nozzle, so that the volume of the moulding space is maintained substantially constant.

Practical tests show that the flow of the plastic material is at its smoothest when the length of the mandrel substantially equals a multiple of a uniform space between the rib-forming grooves of the moulding means, preferably fourfold thereof less the thickness of one groove, each groove having the same thickness. For the same reason, it is essential that the angle between the generatrix of the substantially conically enlarging part of the mandrel and the central shaft of the core is from 2° to 30°, preferably about 15°.

In view of the smoothness of the flow, it is further of advantage that the angle between the generatrix of the conically enlarging part and the central shaft varies in such a manner that it is at its largest at the beginning of said part of the mandrel and at its smallest at the end thereof. The surface of this part of the mandrel can thereby be e.g. parabolic.

According to one preferred embodiment of the invention, the filling volume of the grooves is only a part of the combined volume of the grooves, which prevents the formation of pressure peaks within the material. In the present embodiment, this is effected by providing the inner surface of the chill moulds not only with the grooves forming the filling volume but also with considerably narrower pressure balancing grooves which are of such dimensions that they remain completely or partially empty at the standard material pressures of the apparatus as a result of the viscosity of the material.

By virtue of the pressure balancing grooves, no major pressure peaks can be formed within the moulding space, because the material begins to be forced into the pressure balancing grooves when the pressure exceeds the normal value.

By virtue of the pressure balancing grooves, the scope of application of the apparatus according to the invention is very wide. Accordingly, it is possible to use the apparatus for producing ribbed pipes in a conventional manner so that the grooves of the chill moulds are filled completely, whereby the pressure balancing grooves prevent the formation of pressure peaks, which brings about the advantages described above. Alternatively, the apparatus can be used for the production of pipes having ribs of unequal height by adjusting the degree of fullness of the rib grooves, whereby the pressure balancing grooves can be such that they help to maintain the degree of fullness of the rib grooves at a constant value.

In order that the pressurized material would first fill the rib grooves, and in order that it would fill the pressure balancing grooves only if the pressure rises excessively, it is essential that it is easier for the material to fill the rib grooves than the pressure balancing grooves. Therefore, it is of advantage that the relation of the depth of the pressure balancing grooves to the width thereof is at least double with respect to the respective proportion of the rib grooves. In conventional pipe manufacturing devices, the proportion between the depth and the width of the pressure balancing grooves may range between 3:1 and 15:1, preferably about 10:1. Practical tests show that a suitable width of the pressure balancing grooves is 0.1 to 3 mm, preferably about 1 mm.

However, it is to be noted that the proportions and dimensions given above are only directive, and they can vary in accordance with the viscosity of the used raw material and the standard pressure of the apparatus. It is easy for one skilled in the art to find the proper dimensions for each material by means of experiments.

In order that ridges possibly formed at places where the pressure balancing grooves are positioned would hamper the use of the pipe as little as possible, it is advantageous that the pressure balancing grooves are positioned in the vicinity of the rib grooves and that they are parallel therewith. Ridges positioned beside the ribs do not hamper e.g. the placing of a sealing ring around the pipe between the ribs.

In order to ensure that there are sufficiently pressure balancing grooves provided on the mould surface of the chill moulds, it is advantageous that a pressure balancing groove is formed on both sides of each rib groove.

The invention is also connected with a method for the production of ribbed pipes having a smooth inner face, wherein a plastic material is fed through a ring channel defined between an extrusion sleeve and a core into a moulding space which is defined between an end face of said extrusion sleeve, a conically enlarging core, and moveable moulding means provided with grooves and surrounding said extrusion sleeve and said core.

The method according to the invention is characterized in that the volume of the material fed through said ring channel per time unit is adjusted to be substantially equal to or smaller than the combined volume of those grooves of said moulding means which pass by said ring channel and the pipe wall which is formed during said time unit.

The disadvantageous formation of turbulence and burrs can be avoided by adjusting the feeding speed of the material so that it is equal to or lower than the speed of travel of the chill moulds.

Figure 2:
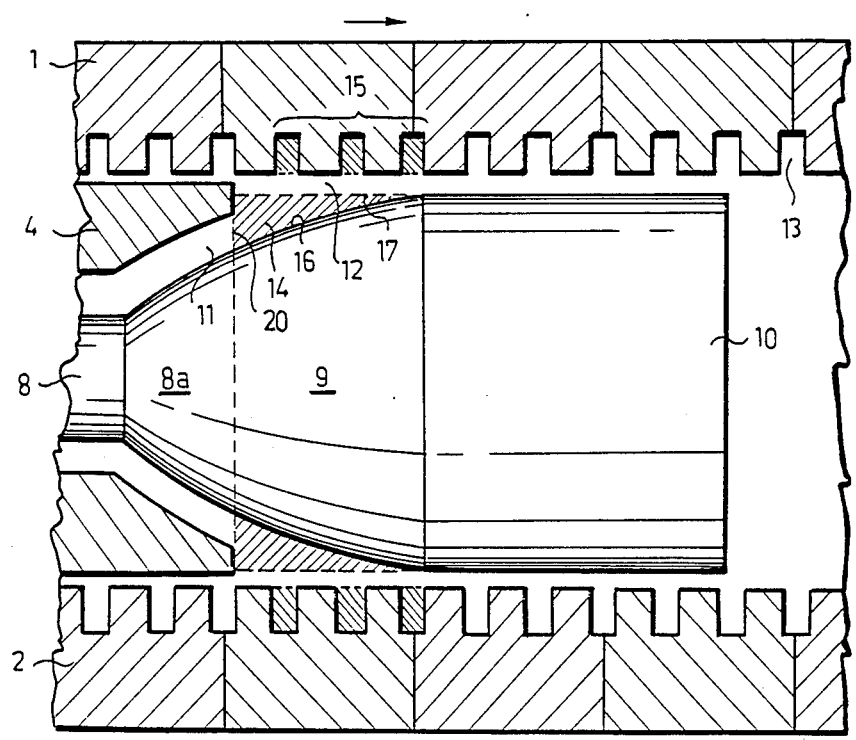
Figure 3:
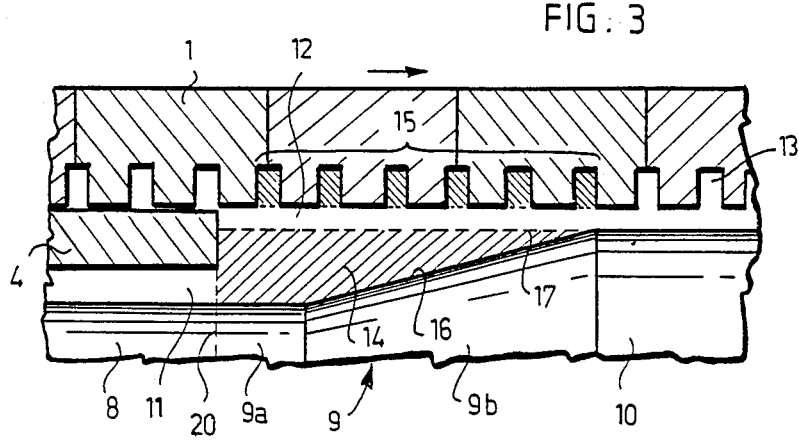
Figure 4:
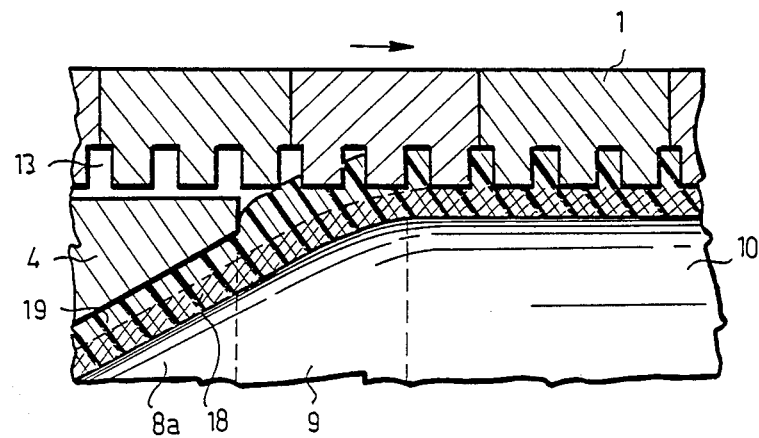
Figure 5:
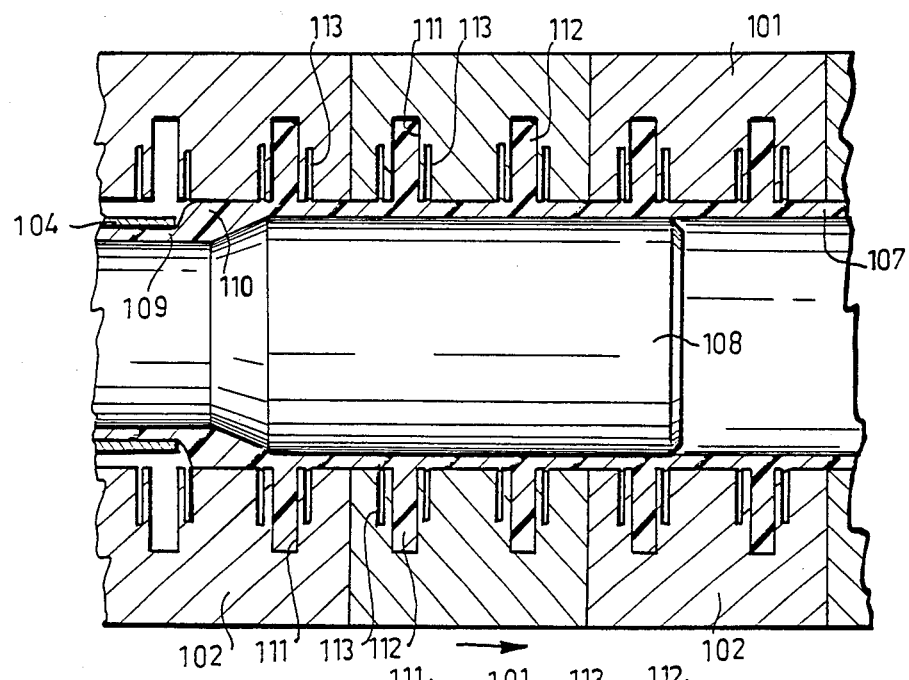
Figure 6:
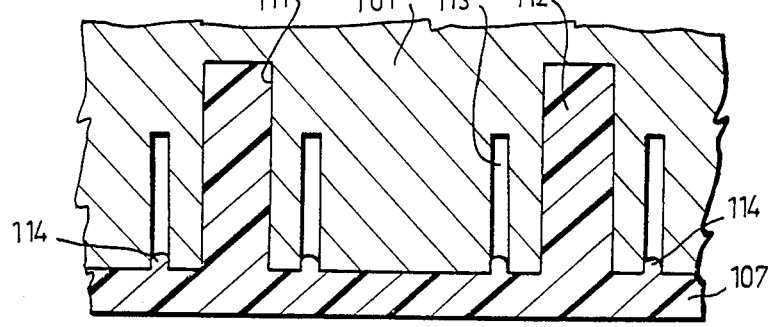

The invention will be described in more detail below with reference to the attached drawing, wherein FIG. 1 illustrates the main features of an apparatus for the production of ribbed pipes, FIG. 2 is an enlarged view of one detail of the apparatus as a longitudinal section, FIG. 3 is a partial view of the second embodiment of the invention, FIG. 4 illustrates the flow of the plastic material, FIG. 5 is a partial view of the third embodiment of the apparatus, and FIG. 6 is an enlarged view of one detail of FIG. 5.

The apparatus shown in FIG. 1 comprises chill moulds 1 and 2 moving around along two endless paths and meeting each other within the area of the guide rails 3 to form a cylindrical mould. An extrusion sleeve 4 connected to an extrusion head 6 of an extruder 5 extends into said mould. It further appears from FIG. 1 how a finished pipe protrudes from the other end of the mould formed by the chill moulds.

FIG. 2 is a more detailed view of those parts of the apparatus which take part in the moulding of the pipe. A spindle 8 is positioned on the central axis of the apparatus wholly within the extrusion sleeve, said spindle comprising a part having a constant diameter and a substantially conically enlarging part 8A. A mandrel 9 likewise substantially conically enlarging is positioned after the enlarging part of the spindle wholly outside the extrusion sleeve, a kernel 10 having a constant diameter being positioned after said mandrel. The kernel is provided with cooling means for the stiffening of the pipe. The spindle 8, the mandrel 9 and the kernel 10 altogether form the core of the apparatus.

The extrusion sleeve 4 and the spindle part 8a form therebetween a ring nozzle 11 through which a plastic material to be moulded is fed into a moulding space 12 defined by the extrusion sleeve 4, the chill moulds 1, 2 and the mandrel 9. In order to obtain a pipe having a ribbed outer face, the inner surface of the chill moulds is provided with mutually spaced grooves 13 into which the plastic material is forced for the formation of ribs.

According to the invention the apparatus provides an extremely smooth flow of the plastic material by virtue of a certain proportioning of the volumes of the two parts of the moulding space 12 with respect to each other.

In FIG. 2, these parts are ruled and indicated by the reference numerals 14 and 15.

The space 14, the volume of which is called a stroke volume, is ring-shaped and has a substantially triangular cross-section. The space is defined between a plane 20 positioned adjacent the end face of the extrusion sleeve 4 perpendicularly, to the center line of the mandrel, a surface 16 of the mandrel, and a plane 17 comprising the envelope face of the kernel 10. The space 15, the volume of which is called a filling volume, is constituted by the combined volume of the ribs 13 positioned between the extrusion sleeve 4 and the kernel 10, i.e. at or within the area of the mandrel 9, at each particular moment. According to the invention, the volumes of the spaces 14 and 15 are substantially identical, the deviation being at the most about 25 percent.

As appears from FIG. 2, the length of the mandrel is threefold in relation to the distance between the ribs 13. Generally speaking, it is advisable that the length of the mandrel 9 substantially corresponds to the multiple of said distance. In the most advntageous case, the length of the mandrel 9 corresponds to the multiple of the distance between the ribs reduced by one thickness of the groove. The pressure variation is thereby at its minimum. In the embodiment of FIG. 2, the generatrix of the surface 16 of the mandrel is at an angle of about 20° with respect to the central axis of the core. This angle may vary from 2° to 30°, the most advantageous angle for most applications being about 15°. The accurate size of the angle is determined by the required stroke volume. It further appears from the figure that the surface 16 is not purely cylindrical but arched to some extent so that the angle between the generatrix and the central shaft of the core is at its largest at the beginning of the mandrel and at its smallest at the end thereof. The surface 16 is preferably parabolic.

FIG. 3 shows the second embodiment of the apparatus according to the invention. In this case, the mandrel 9 is formed by a straight part 9a positioned closest to the spindle 8 and this part is followed by a conically enlarging part 9b whereto a straight kernel 10 is connected. The stroke volume of the apparatus is constituted similarly as in the embodiment of FIG. 2, i.e. the space is defined between the planes 20 and 17 and the surface 16, which in this case extends over the straight part 9a of the mandrel, too. The filling volume of the apparatus is constituted by the grooves 13 positioned within the area of the surface. These grooves are ruled.

FIG. 4 illustrates the moulding of the plastic material when it reaches the moulding space 12. A layer 18 of the plastic material positioned closest to the spindle and the mandrel and indicated by crosswise lines proceeds as a nearly unhindered laminar flow into a space between the kernel 10 and the chill moulds 1, 2, where it forms a pipe wall. A plastic layer 19 positioned closest to the extrusion sleeve 4 and indicated by parallel lines is, in turn, forced into the grooves 13 of the chill moulds, being thus moulded entirely in accordance with the inner surface of the chill moulds.

When producing pipes by means of the apparatus according to the invention, a pressurized plastic material is fed through the nozzle 11 into the moulding space 12. It is essential in the method according to the invention that the feeding speed of the material in the nozzle 11 is kept at a value which is equal to or smaller than the speed of travel of the chill moulds. The part 18 of the material forms the wall 7 of the pipe, while the part 19 is forced into the grooves 13 of the chill moulds, thus filling said grooves when the chill moulds are displaced in the direction of the arrow shown in the figures. Since the stroke volume 14 and the filling volume 15 shown in FIGS. 2 and 3 are identical, the flow of the material is very smooth and even in the moulding space 12 so that there are no major air closures or weak joints between the different material layers in the material positioned within the area of the kernel 10.

According to the invention the flow of the material can be adjusted in the axial and in the radial direction by varying the relation between the temperatures of the chill moulds and the core. For instance, if the grooves of the chill moulds are not filled completely, the temperature of the core can be decreased and the temperature of the chill moulds can be increased so that the axial flow of the material is retarded and the radial flow is speedened. As a result thereof the grooves are filled better than previously.

By means of the invention it is easy to produce pipes the ribs of which are made of a plastic of different properties than the plastic forming the wall of the pipe. The plastic materials can e.g. differ in colour or the ribs can be made of an impact strength modified plastic while the wall is made of an ordinary plastic. In this case the plastic material is fed from the ring channel 11 as two concentric layers which corresponds to the layers 18, 19 of FIG. 4. The layers are fed through separate extruders.

As already stated above, the filling volume of the grooves 13 means that volume which is to be filled with the plastic material so that the volume of the grooves can be larger than the volume of the space 14. This can be effected by means of the third embodiment shown in FIGS. 5 and 6. As shown in these figures, a core 108 is positioned on the center line of the apparatus, which core comprises a straight part and a conically enlarging part and which is followed by a cooling part having a constant diameter and comprising cavities (not shown) for a cooling agent. An extrusion sleeve 104 and the core 108 form therebetween a ring nozzle 109 through which a plastic material is fed into a moulding space 110 defined between the chill moulds, the core and the extrusion sleeve. In order to obtain a pipe having a ribbed outer face, the inner surface of the chill moulds is provided with mutually spaced annular grooves 111 into which the plastic material is forced for the formation of ribs 112.

According to the present embodiment of the invention the inner surface of the chill moulds 101, 102 are provided with pressure balancing grooves 113 in addition to said rib grooves 111. These pressure balancing grooves are so dimensioned that they remain completely or partially empty at the standard material pressures of the apparatus by virtue of the viscosity of the material.

In the embodiment of FIGS. 5 and 6, the pressure balancing grooves 113 are very narrow and they are positioned on both sides of the rib grooves 111 adjacent thereto. In addition, the pressure balancing grooves extend in parallel with the rib grooves.

As appears from the figure, the pressure balancing grooves 113 are very deep in relation to the width thereof. In the shown embodiment, the proportion of the depth of the pressure balancing grooves to the width thereof is about 10:1, i.e. if the width of the groove is e.g. 1 mm, it is 10 mm in depth. Pressure balancing grooves dimensioned in this way usually match rib grooves 111 having a width of 4 mm and a depth of 14 mm. It is, however, to be noted that the dimensions of the pressure balancing grooves and the proportions between the grooves 111 and 113 are dependent on the material used for the pipe, especially on the viscosity thereof.

When producing pipes by means of the apparatus according to FIGS. 5 and 6, a pressurized plastic material is fed through the nozzle 109 into the moulding space 110. Part of the material forms a pipe wall, while the rest thereof is forced into the rib grooves 111 of the chill moulds to fill them simultaneously as the chill moulds are displaced in the direction of the arrow shown in FIG. 5. The volume of the moulding space 110 changes abruptly when the groove111 reaches the moulding space. For this reason, and possibly also on account of the swaying of the feeding of the material and the speed of travel of the chill moulds, the pressure of the material flowing through the moulding space varies to a great extent. By virtue of the pressure balancing grooves 113, the pressure peaks, however, are not as high as in known apparatuses, because it is possible for the material to protrude into the pressure balancing grooves, too, which grooves thus act as a kind of safety valves. The degree of fullnes of the pressure balancing grooves depends on the highness of the pressure peaks. Under normal conditions the material does not to any greater degree protrude into the pressure balancing grooves, wherefore a low ridge 114 only is formed at places where the grooves are positioned, see FIG. 6.

As distinct from the above, the pressure balancing grooves can be positioned somewhere else than in the immediate vicinity of the rib grooves 111, e.g. in the midway between the rib grooves. The pressure balancing grooves need not either extend in parallel with the rib grooves but they can have some other suitable direction.

I claim:

1. An apparatus for the production of an outwardly-ribbed, plastic pipe having a smooth inner face, the appartus comprising:

an extrusion sleeve having an end face;

a core positioned on the center line of the extrusion sleve and spaced therefrom, the core comprising a spindle within the extrusion sleeve, a mandrel having an outer surface and one end on one end of the spindle, protruding from the end face of the extrusion sleeve to an opposite end and enlarging substantially conically away from the spindle, and a kernel having an outer surface of sub-stantially constant diameter extending from the opposite end of the mandrel, whereby the core and extrusion sleeve form a tubular channel for communicating with a device for feeding plastic material therefrom; and moulding means surrounding the extrusion sleeve and core at the end face of the extrusion sleeve for moulding an outwardly-ribed pipe having a smooth inner face from the plastic material from the tubular channel of the latter, the moulding means comprising at least two endless rows of chill moulds moving along the extrusion sleeve and core in a direction of production from the extrusion sleeve toward the kernel, the inner surfaces of the cill moulds having rib-forming grooves uniformly spaced therealong for forming the outward ribs of the pipe, the volume of an annular space defined by a plane extending transversely to the center line of the extrusion sleeve at the end face of the extrusion sleeve, the outer surface of the mandrel, and a cylindrical plane projection thereabout from the outer surface of the kernel corresponding substantailly to the combined filling volume of those rib-forming grooves of the molding means positioned at the mandrel at each particular moment.

2. The apparatus according to claim 1, wherein the volumes deviate from each other, at the most, by 25%.

3. The apparatus according to claim 1, wherein the length of the mandrel substantially corresponds to a multiple of the space between the rib-forming grooves of the molding means, less the thickness of one of the rib-forming grooves, each groove having the same thickness.

4. The apparatus to claim 1, wherein the generatrix of the substantially-conical enlargement of the mandrel is at an angle of from 2° to 30° with respect to the center line of the extrusion sleeve.

5. The apparatus according to claim 4, wherein the angle of the generatrix is about 15°.

6. The apparatus according to claim 4, wherein the angle of the generatrix varies and is largest at the one, spindle end of the mandrel and smallest at the opposite end thereof.

7. The apparatus according to claim 3, wherein the substantially-conical enlargement of the mandrel is paraboloid.

8. The apparatus according to claim 1, and further comprising pressure-balancing grooves spaced along theinner surface of the chill molds, the pressure-balancing grooves being considerably narrower than the other, rib-forming grooves and so dimensioned that they remain completely or partially empty of the plastic material at the standard plastic-material pressures of the apparature as a result of the viscosity of the plastic material.

9. The apparatus according to claim 8, wherein the ratio of the depthof the pressure-balancing grooves to the width thereof is at least double that of the other, rib-forming grooves.

10. The apparatus according to claim 9, wherein the ratio of the depth of the pressure-balancing grooves to the width thereof ranges from 3:1 to 15:1.

11. The apparatus according to claim 10, wherein the ratio of the depth of the pressure-balancing grooves to the width thereof is about 10:1.

12. The apparatus according to claim 10, wherein the width of the pressure-balancing grooves is from 0.3 to 3 mm.

13. The apparatus to claim 12, wherein the width is about 1 mm.

14. The apparatus according to claim 8, wherein the pressure-balancing grooves are in the vicinity of the other, rib-forming grooves and parallel therewith 15. The apparatus according to claim 13, wherein a pressure-balancing groove is on each side of each of the other, rib-forming grooves.

16. A method of producing outwardly-ribbed plastic having a smooth inner face, themethod comprising:

feeding plastic material through a tubular channel defined between an extrusion sleeve and a core on the centerline thereof into a moulding space defined between an end face of the extrusion sleeve, a substantially-conically enlarging mandrel of the core projecting from the end face of the extrusion sleeve, and moulding means having rib-forming grooves, sur-rounding the extrusion sleeve and core at the end face of the extrusion sleeve and moving post the latter for moulding plastic pipe having an outwardly-ribbed pipe wall with a smooth inner surface, the volume of the plastic material fed through the tubular channel per unit time being at least substantially equal to, but not substantially more than the sum of the volume of the pipe wall and the filling volume of those grooves of the moulding means which pass the end face of the extrusion sleeve during the unit of time.

17. The method according ot claim 16, and further comprising adjusting the flow rate of the plastic material in the axial and radial directions of a molding space of the apparatus between the mandrel and moulding means by varying the relation between the temperatures of the core and chill molds comprising the moulding means.

18. The method according to claim 16, wherein the plastic material is fed through the tubular channel as two concentric layers from separate extruders therefor.

19. The method according to claim 16, wherein the speed of the feeding of the plastic material is substantially equal to the speed of the movement of the moulding means.

* * * * *